(12) United States Patent
Chien et al.

(10) Patent No.: US 7,596,809 B2
(45) Date of Patent: Sep. 29, 2009

(54) SYSTEM SECURITY APPROACHES USING MULTIPLE PROCESSING UNITS

(75) Inventors: Shih-Wei Chien, Taichung (TW); Shi-Ming Zhao, Taipei (TW)

(73) Assignee: Lionic Corporation, Hsinchu (TW)

( * ) Notice: Subject to any disclaimer, the term of this patent is extended or adjusted under 35 U.S.C. 154(b) by 855 days.

(21) Appl. No.: 11/078,010

(22) Filed: Mar. 11, 2005

(65) Prior Publication Data
US 2005/0278783 A1    Dec. 15, 2005

Related U.S. Application Data

(63) Continuation-in-part of application No. 10/868,665, filed on Jun. 14, 2004.

(51) Int. Cl.
*G06F 21/00* (2006.01)

(52) U.S. Cl. .................................... 726/22; 713/188

(58) Field of Classification Search ................ 726/22
See application file for complete search history.

(56) References Cited

U.S. PATENT DOCUMENTS

| | | |
|---|---|---|
| 5,319,776 A | 6/1994 | Hile |
| 5,414,833 A | 5/1995 | Hershey et al. |
| 5,623,600 A | 4/1997 | Ji |
| 5,978,801 A | 11/1999 | Yuasa |
| 5,982,891 A | 11/1999 | Ginter |
| 6,487,666 B1 | 11/2002 | Shanklin |
| 6,598,034 B1 * | 7/2003 | Kloth .......................... 706/47 |
| 6,609,205 B1 | 8/2003 | Bernhard |
| 6,792,546 B1 * | 9/2004 | Shanklin et al. ............... 726/23 |
| 6,880,087 B1 | 4/2005 | Carter |
| 7,180,895 B2 | 2/2007 | Smith |
| 2002/0073330 A1 | 6/2002 | Chandnani et al. |
| 2002/0124187 A1 | 9/2002 | Lyle |

(Continued)

FOREIGN PATENT DOCUMENTS

CA    2 307 529 A1    9/2001

(Continued)

OTHER PUBLICATIONS

James Moscola, et al, "Implementation of a Content-Scanning Module for an Internet Firewall", Field-Programmable Custom Computing Machines, FCCM 2003. Proceedings the 11th Annual IEEE Symposium on Apr. 9-11, 2003, Piscataway, NJ, USA, IEEE. XP010655273; ISBN 0-7695-1979-2.

(Continued)

*Primary Examiner*—Gilberto Barron, Jr.
*Assistant Examiner*—Samson B Lemma
(74) *Attorney, Agent, or Firm*—Winston Hsu

(57) ABSTRACT

A method and system for ensuring system security is disclosed. The method and system utilize a first processing unit to split a regular expression that corresponds to a number of patterns into sub-expressions and maintain the dependency relationships among the finite automata that correspond to the sub-expressions. Then, the method and system utilize a second processing unit to move the data units through these finite automata in a sequence that is based on the dependency relationships to identify the suspected data units. The suspected data units are the ones containing content that collectively matches one or more of the aforementioned patterns. Identification of the suspected data units is based on the merged results of the finite automata.

24 Claims, 8 Drawing Sheets

U.S. PATENT DOCUMENTS

| | | | |
|---|---|---|---|
| 2003/0004689 A1 | 1/2003 | Gupta et al. | |
| 2003/0123447 A1 | 7/2003 | Smith | |
| 2004/0105298 A1 | 6/2004 | Symes | |
| 2005/0278781 A1* | 12/2005 | Zhao et al. | 726/22 |
| 2006/0005241 A1* | 1/2006 | Zhao et al. | 726/22 |

FOREIGN PATENT DOCUMENTS

| | | |
|---|---|---|
| GB | 2 417 655 A | 3/2006 |
| WO | WO 2004/079571 A2 | 9/2004 |

OTHER PUBLICATIONS

Alio, Sethi, Ullman, "Compilers", 1986, Sec 3.7, p. 121-128. XP002381613.

C. Scott Ananian, "JLex: A Lexical Analyzer Generator for Java(TM)". version 1.2.6, Feb. 7, 2003, p. 1-2, Internet. XP002382680.

Reetinder Sidhu, et al, "Fast Regular Expression Matching using FPGAs" Field-Programmable Custom Computing Machines, 2001. FCCM'01. The 9th annual IEEE Symposium on rohnert park, CA, USA, Apr. 29, 2001, paragraph 02.4. XP010789123; ISBN 0-7695-2667-5.

Christopher R. Clark et al. "A pattern-matching co-processor for network intrusion detection systems" Field-Programmable Technology (FPT). Proceedings 2003 IEEE International Conference on Dec. 15-17, 2003, Piscataway, NJ, USA, IEEE, pp. 68-74. XP010688321; ISBN 0-7803-8320-6.

Elliot Berk, JLex:A lexical analyzer generator for Java(TM), Sep. 6, 2000, http://www.cs.pitt.edu/~mock/cs2210/ handouts/jlex-manual. pdf.

* cited by examiner

SYSTEM SECURITY APPROACHES USING MULTIPLE PROCESSING UNITS

CROSS REFERENCE

This application is a continuation-in-part of U.S. application Ser. No. 10/868,665 filed on Jun. 14, 2004, which is incorporated herein by reference in its entirety.

FIELD

This patent document generally relates to system security approaches, especially methods and systems relating to preventive measures in response to attacks to a device on a network.

BACKGROUND

Unless otherwise indicated herein, the approaches described in this section are not prior art to the claims in this application and are not admitted to be prior art by inclusion in this section.

As computer networks become ubiquitous, any device that is connected to the networks is susceptible to debilitating attacks, such as viruses, worms, and cracker attacks. Typical approaches to counter these attacks include firewall techniques and anti-virus programs. Firewalls generally prevent certain types of files or packets from entering a network, and anti-virus programs typically prevent files that contain virus patterns from being executed on a device or a group of devices.

Several types of firewall techniques exist today. Some examples include packet filter, application gateway, and proxy server. The packet filter approach inspects the control information of each packet and determines whether to accept or reject the packet based on user-defined rules. The application gateway approach applies a security mechanism to certain applications, such as FTP and Telnet servers. The proxy server approach utilizes an in-between server to intercept and inspect packets between a client application and a server on a network to which the client application submits requests to. None of these existing techniques inspects the payload data portion of each packet or handles malicious code segments that spread across packet boundaries.

An anti-virus program that executes on a device generally assembles incoming packets received by the device into a file before determining whether the assembled file includes certain predetermined virus patterns. In such approaches, no inspection takes place until after a file or a block of data has been assembled. For attacks that target real-time protocols, the timing requirements of the protocols would render the aforementioned assembling-before-scanning approaches essentially inoperable.

DETAILED DESCRIPTION

Figure 1:
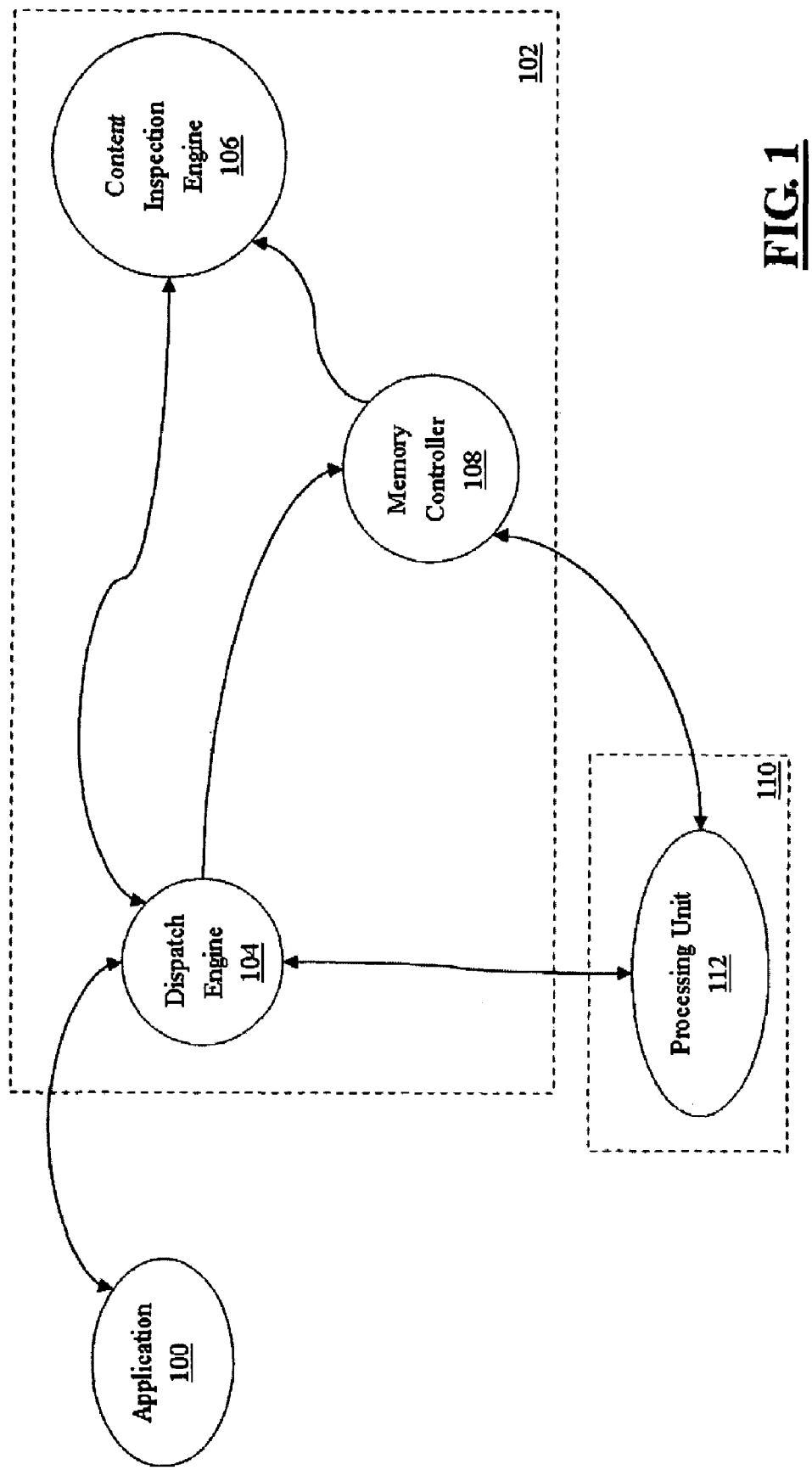
FIG. 1 is a data flow diagram of one embodiment of a system security approach.

System security approaches are described. In the following description, for the purposes of explanation, numerous specific details are set forth in order to provide a thorough understanding of the present invention. It will be apparent, however, to one skilled in the art that the present invention may be practiced without these specific details.

The general theories behind "regular expression," "state machine," and "automaton," are well known in the art and will not be elaborated in detail. However, throughout this disclosure, "state machine" is used interchangeably with "state automaton". "Wild card" generally refers to special symbols, such as a combination of the period and the asterisk (.*), that stand for zero, one, or more characters (e.g., ".*abc" refers to all patterns that end with "abc"). Each "data unit" generally refers to data that are stored in a particular memory location or a packet with a destination address. An "application" generally refers to a program or a group of programs designed for a user of a terminal or a computer system.

1.0 General Overview

The system security approaches as discussed below include methods and systems that utilize a first processing unit to split a regular expression that corresponds to a number of patterns into sub-expressions and maintain the dependency relationships among the finite automata that correspond to the sub-expressions. The methods and systems also utilize a second processing unit to move the data units through these finite automata in a sequence that is based on the dependency relationships to identify the suspected data units. The suspected data units are the ones containing content that collectively matches one or more of the aforementioned patterns. Identification of the suspected data units is based on the merged results of the finite automata.

2.0 System Security Approaches

2.1 Overview

An overview of system security approaches is now provided. To "secure" a system, one approach is to examine data units that enter into and depart from the system to ensure that the system is freed from invasion of unwanted codes and unauthorized accesses. The approach is based in part on the use of regular expressions, which generally refer to sets of symbols and syntactic elements used to represent certain patterns. For example, a simple regular expression, such as (a/b)t, represents the patterns "at" and "bt". Although a well-crafted regular expression may appear concise, especially with the use of wild cards, the expression may represent many patterns and result in a state machine with many states.

One system security approach is also based in part on managing and manipulating the states in various state automata that are derived from the regular expressions to effectively search and match certain patterns. As more and more patterns are identified as unwanted patterns, additional steps are also needed to accelerate the searching and matching of various patterns while lessening storage requirements.

One embodiment of the system security approach has at least one process dedicating to generate the state automata from the regular expressions and at least one separate process dedicating to use the state automata to search for the unwanted patterns. In addition, at least one of the processes is also capable of monitoring the data units for anomalies that cannot be described with the regular expressions.

FIG. 1 is a data flow diagram of one embodiment of a system security approach. This embodiment includes two main processes: 1) process 102, which is mainly carried out by dispatch engine 104, content inspection engine 106, and memory controller 108, and 2) process 110, which is mainly carried out by processing unit 112. Process 110 generates the state automata, and process 102 searches for the suspected data units that contain the unwanted patterns, such as, without limitation, known viruses, worms, spam, illegal accesses, or any malicious codes that are represented by the state automata. These unwanted patterns can also be sound patterns, image patterns, or any other non-text based patterns, as long as they can be translated to regular expressions. Process 110 also performs functions such as, without limitation, decompressing the data contained in data units and monitoring data units for any irregularity that cannot be described by regular expressions.

Figure 2:
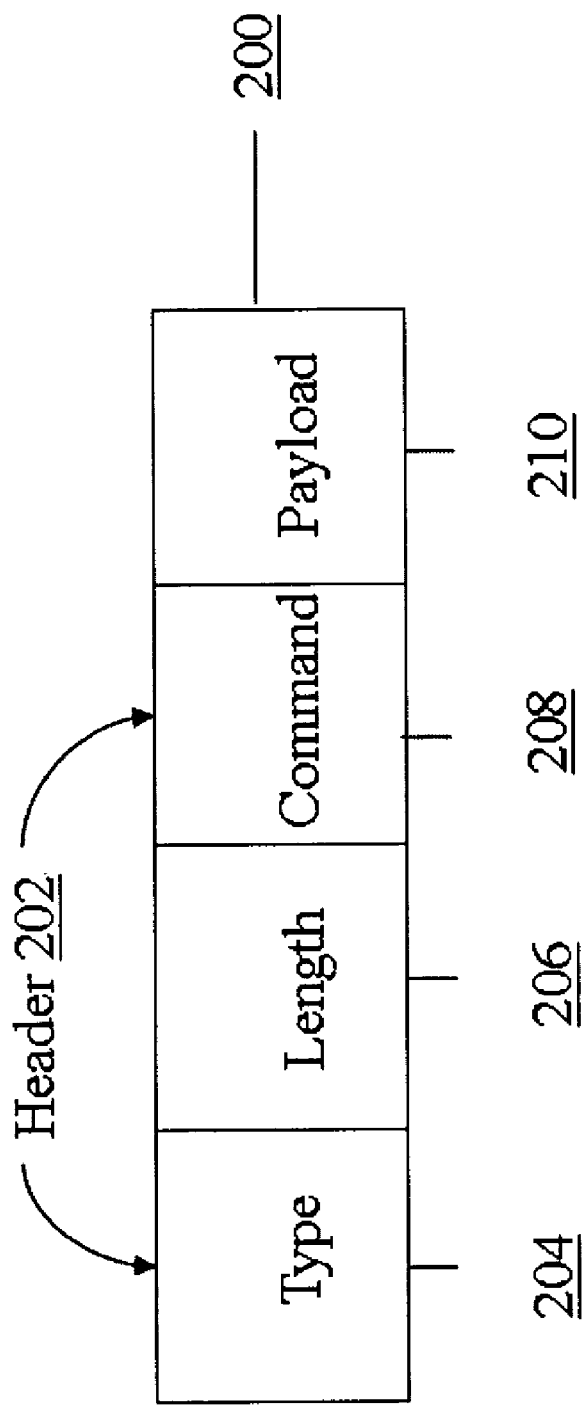
FIG. 2 shows a segment of one embodiment of a data unit.

FIG. 2 shows data unit segment 200, which is a segment of one embodiment of a data unit. Data unit segment 200 mainly includes header field 202 and payload field 210. Header field 202 contains additional fields, such as, without limitation, type field 204, length field 206, and command field 208. Payload field 210 contains textual data, multimedia data, and/or control information.

In this embodiment, type field 204 contains information indicative of the various types of data units. For example, payload field 210 of the first type of a data unit may contain the regular expressions representing a partial or an entire unwanted pattern or the information for configuring process 102 or process 110. On the other hand, payload field 210 of the second type of a data unit may contain data that are to be inspected for unwanted patterns and anomalies by process 102. In some instances, the data in the second type of the data unit are also manipulated by process 110. Thus, a process having received the data unit can use the information in type field 204 to determine whether the data unit is the first type or the second type and take actions accordingly. Throughout the disclosure, the first type and the second type of the data units discussed above are generally referred to as the "system-type" and the "user-type" data units, respectively.

Length field 206 contains the length information of the data in payload field 210, and command field 208 contains the instructions for processing unit 112, memory controller 108, and content inspection engine 106 to perform certain tasks. For example, the instructions may cause processing unit 112 to decompress the data in payload field 210 or check the data for anomalies. Each command field 208 can contain one or more instructions, and the instructions can be directed to one or more components. In other words, command field 208 can contain a single instruction for a single component, such as processing unit 112, multiple instructions all for a single component, or multiple instructions for multiple components, such as some instructions for processing unit 112, others for memory controller 108, and yet others for content inspection engine 106.

In one embodiment, dispatch engine 104 serves a common gateway to application 100. Specifically, based on the information in the header fields and payload fields of the data units dispatch engine 104 receives, dispatch engine 104 distributes the data units to content inspection engine 106, memory controller 108, and processing unit 112 for further processing. Generally, content inspection engine 106 is dedicated to identifying the suspected data units with the data that collectively match the unwanted patterns. Processing unit 112, on the other hand, performs tasks such as, without limitation, decompressing the data in the payload fields of the data units and monitoring the data units for irregularities or anomalies. Moreover, dispatch engine 104 also organizes the results from content inspection engine 106 and processing unit 112 and passes the organized results to application 100. The subsequent discussions will further elaborate the interactions among the aforementioned components.

Figure 3:
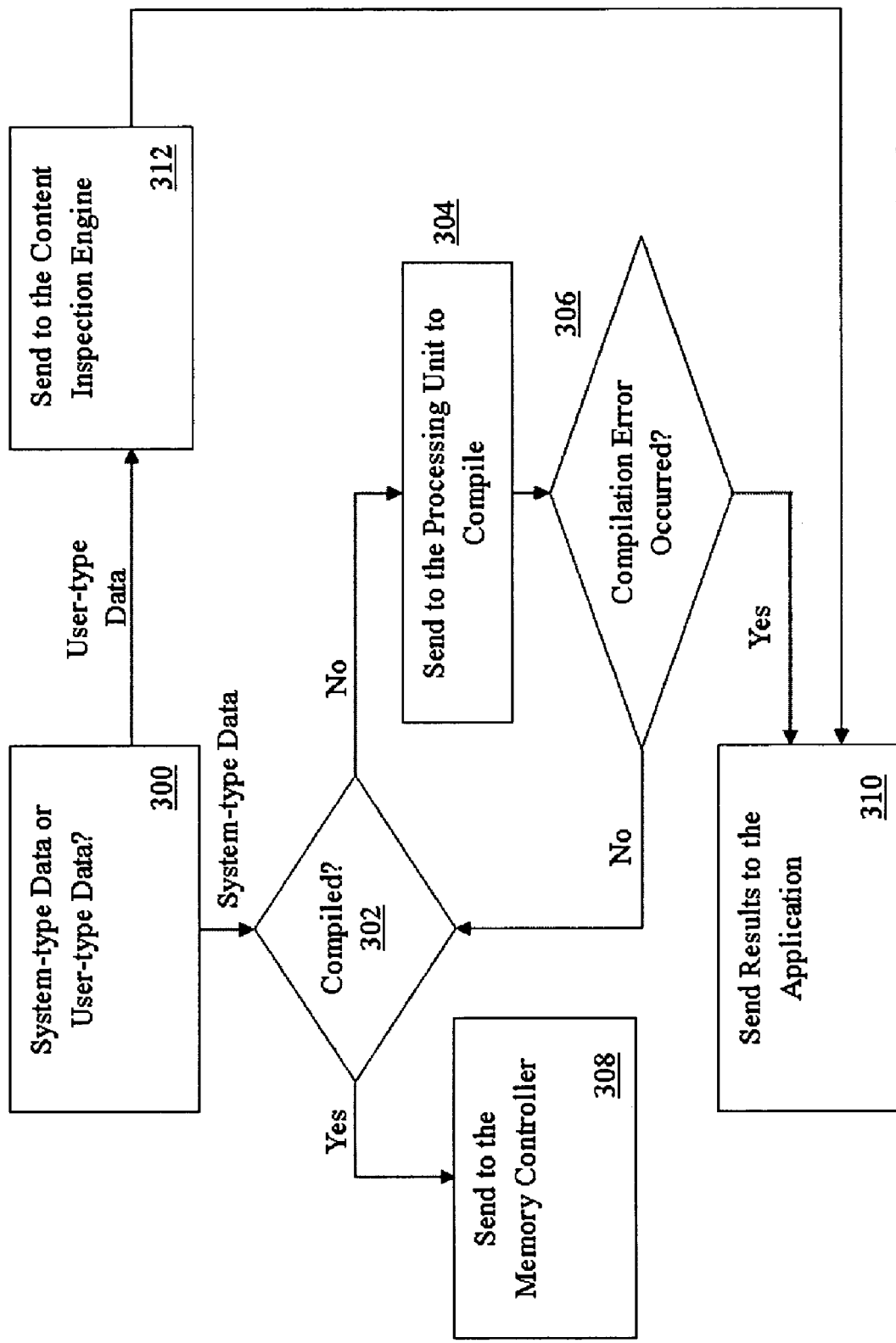
FIG. 3 illustrates one process that one embodiment of a system security approach follows to establish and use the automata and the state tables representative of the unwanted patterns.

2.2 Establishment and Use of Automata and State Tables by Multiple Processing Units FIG. 3 illustrates one process that one embodiment of a system security approach follows to establish and use the automata and the state tables representative of the unwanted patterns. In block 300, if dispatch engine 104 as shown in FIG. 1 recognizes the received data unit to be a system-type data unit based on the information in type field 204 as shown in FIG. 2, then dispatch engine 104 further examines command field 208 of the data unit to determine whether the data unit contains the regular expressions that need to be converted or the information relating to the already converted automata and state tables. This process of converting the regular expressions to the automata and state tables is also referred to as the "compiling" process.

If command field 208 of the data unit includes instructions for processing unit 112 to generate the automata and state tables, then dispatch engine 104 sends the data unit to processing unit 112 in block 304, where processing unit 112 compiles the data in payload field 210 of the data unit. In some instances, processing unit 112 detects compilation errors in block 306. For instance, if the syntax of the regular expressions is inaccurate, then the state automata and state tables cannot be generated. Another compilation error occurs if the resulting state automata and state tables would occupy more memory locations than the memory capacity allotted for process 102, process 110, or both of the processes. In one implementation, processing unit 112 reports the compilation errors to application 100 via dispatch engine 104 in block 310.

On the other hand, if command field 208 of the data unit includes instructions for memory controller 108 to store and manage the information relating to the already converted automata and state tables, then dispatch engine 104 sends the data unit to memory controller 108 in block 308 so that the data in payload field 210 of the data unit are stored. In one implementation, memory controller 108 loads the converted automata and state tables into memory locations for content inspection engine 106 to access prior to or at the initialization of content inspection engine 106. In some instances, memory controller 108 detects loading errors. For example, one type of loading error occurs if the stored data become corrupted.

If dispatch engine 104 recognizes the received data unit to be a user-type data unit based on the information in type field 204 in block 300 and if command field 208 includes instructions for content inspection engine 106 to search for and identify the suspected data units, then dispatch engine 104 sends the data unit to content inspection engine 106 for the examination of the data in payload field 210 of the data unit in block 312. Content inspection engine 106 sends its search results to application 100 in block 310.

2.3 Decompression of Data

Figure 4:
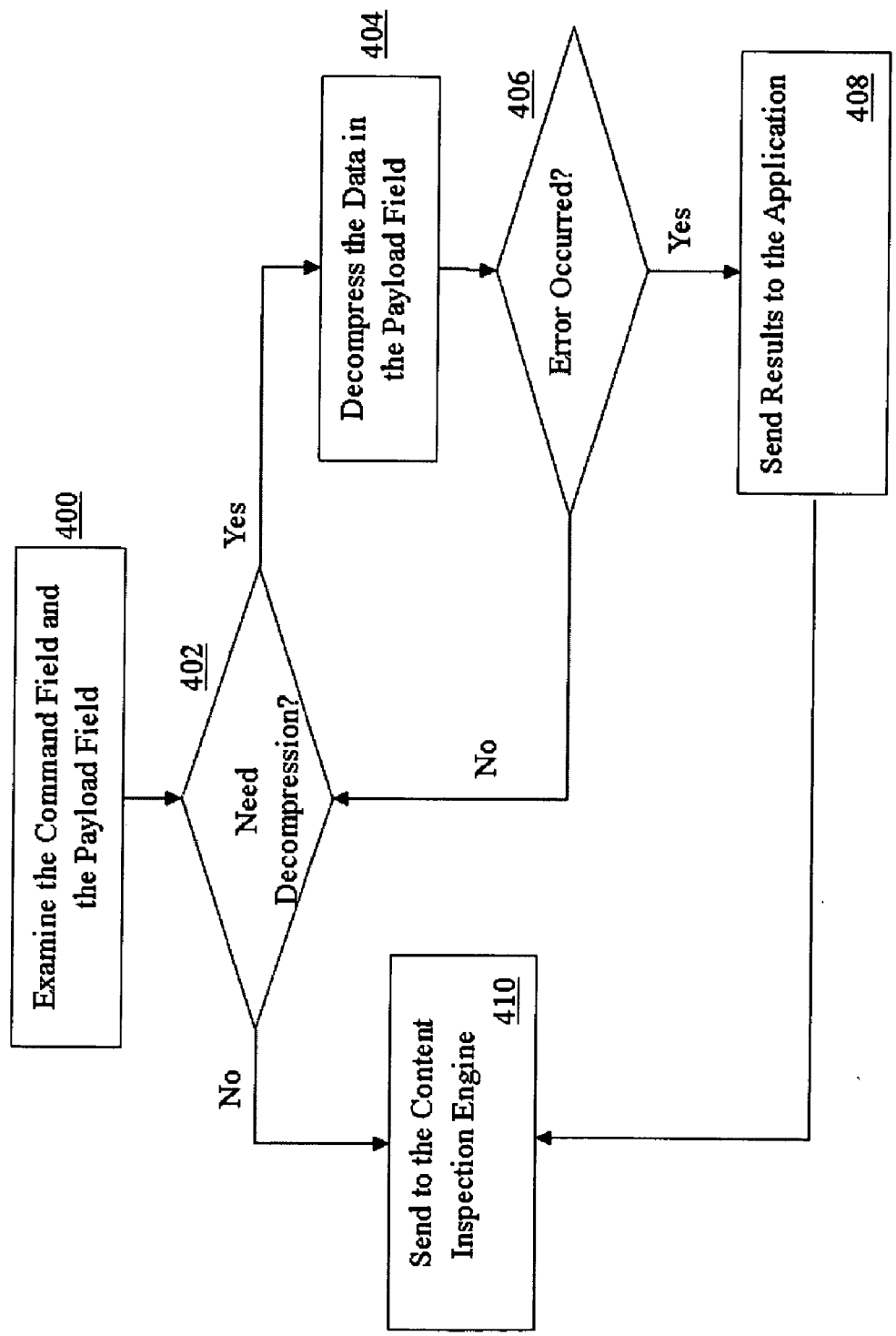
FIG. 4 illustrates one process that one embodiment of a system security approach follows to decompress the data in a data unit.

When the received data unit is a user-type data unit, the data unit could contain compressed data. For example, if application 100 is an email application, then the data unit could contain data that are representative of the compressed attachment sent by the email application. FIG. 4 illustrates one process that one embodiment of a system security approach follows to decompress the data in a data unit.

In particular, prior to sending the data unit to content inspection engine 106 in block 410, dispatch engine 104 examines command field 208 and payload field 210 of the data unit in block 400. In one implementation, if command field 208 includes the instructions for processing unit 112 to decompress the data in payload field 210, then dispatch engine 104 sends the data unit to processing unit 112 in block 404, where processing unit 112 decompresses the data according to the instructions. In some instances, processing unit 112 detects decompression errors in block 406. For example, a decompression error occurs if the processing unit 112 does not have access to the required memory capacity for performing the mathematical computations. Another decompression error occurs if processing unit 112 does not have all the information, such as the password, to perform the decompression. In one implementation, processing unit 112 reports the decompression errors to application 100 via dispatch engine 104 in block 408 and does not proceed to inspect the data unit for unwanted patterns.

2.4 Detection of Anomalies

Figure 5:
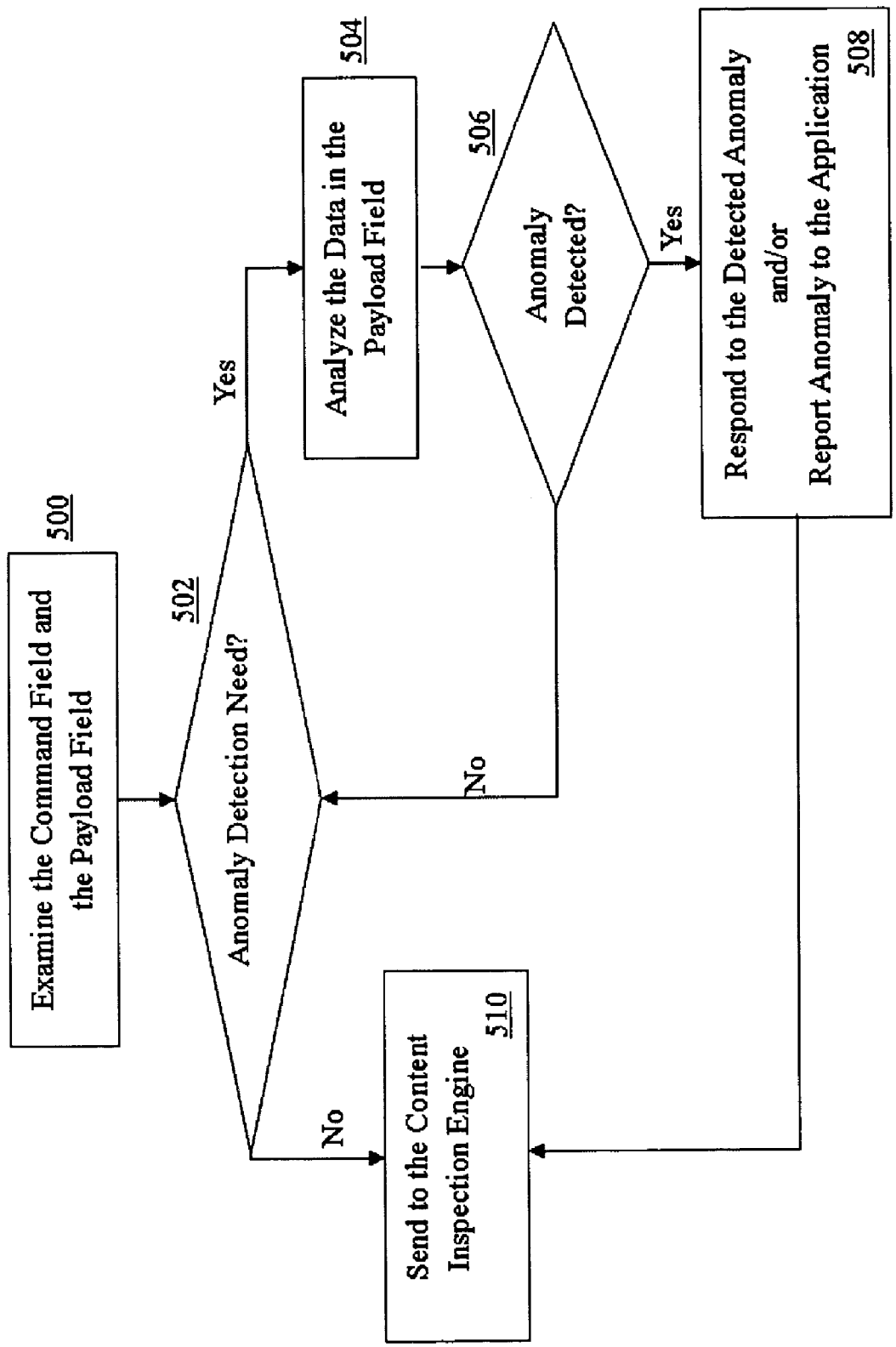
FIG. 5 illustrates one process that one embodiment of a system security approach follows to identify the anomalies of the data units.

Furthermore, when the received data units are user-type data units, the data units could contain data that would bring undesirable consequences to the receiving system but cannot be described using regular expressions. For example, in a denial-of-service attack, the resources of a receiving system are exhausted to handle the volume of the received data units and not the unwanted patterns that are resident in the data units. FIG. 5 illustrates one process that one embodiment of a system security approach follows to identify the anomalies of the data units.

Prior to sending the data unit to content inspection engine 106 in block 510, dispatch engine 104 examines command field 208 and payload field 210 of the data unit in block 500. In one implementation, if command field 208 includes the instructions for processing unit 112 to look for anomalies, then dispatch engine 104 sends the data unit to processing unit 112 in block 504, where processing unit 112 analyzes certain characteristics of the received data units according to the instructions and certain anomaly policies. As an illustration, one anomaly policy can be to limit the receipt and processing of a threshold number of data units containing the same data in their respective payload fields. Thus, as processing unit 112 tracks the number of the data units meeting the criteria of the anomaly policy pursuant to the instructions, after the number exceeds the threshold number in block 506, processing unit 112 responds to the detected anomaly (e.g., rejecting the subsequently received data units with the same data) and/or reports the detected anomaly to application 100.

Although not explicitly shown in FIG. 5, the aforementioned blocks 506 and 508 can also be executed after the inspection of the content of the data units. In other words, in one implementation, block 510 can be executed prior to the anomaly detection process, or before block 500. After block 510 is executed, one embodiment of processing unit 112 rectifies certain detected unwanted patterns or anomalies by placing either zeroes or a predetermined data patterns in the data units. For example, if the data units contain unwanted patterns, commands that could cause instability to the receiving system, or codes that violate any communication and operation protocols, processing unit 112 not only detects such patterns and anomalies, but can also replace them with "harmless" patterns, such as all zeroes, which are patterns that would not cause undesirable consequences to the receiving system.

It should be noted that the anomaly policy discussed above can be configurable via the system-type data units. The configuration would be similar to the compilation process shown in FIG. 3. Specifically, processing unit 112 can configure the anomaly policy based on the data in the command fields and payload fields of the data units.

3.0 Example System Structure

Figure 6:
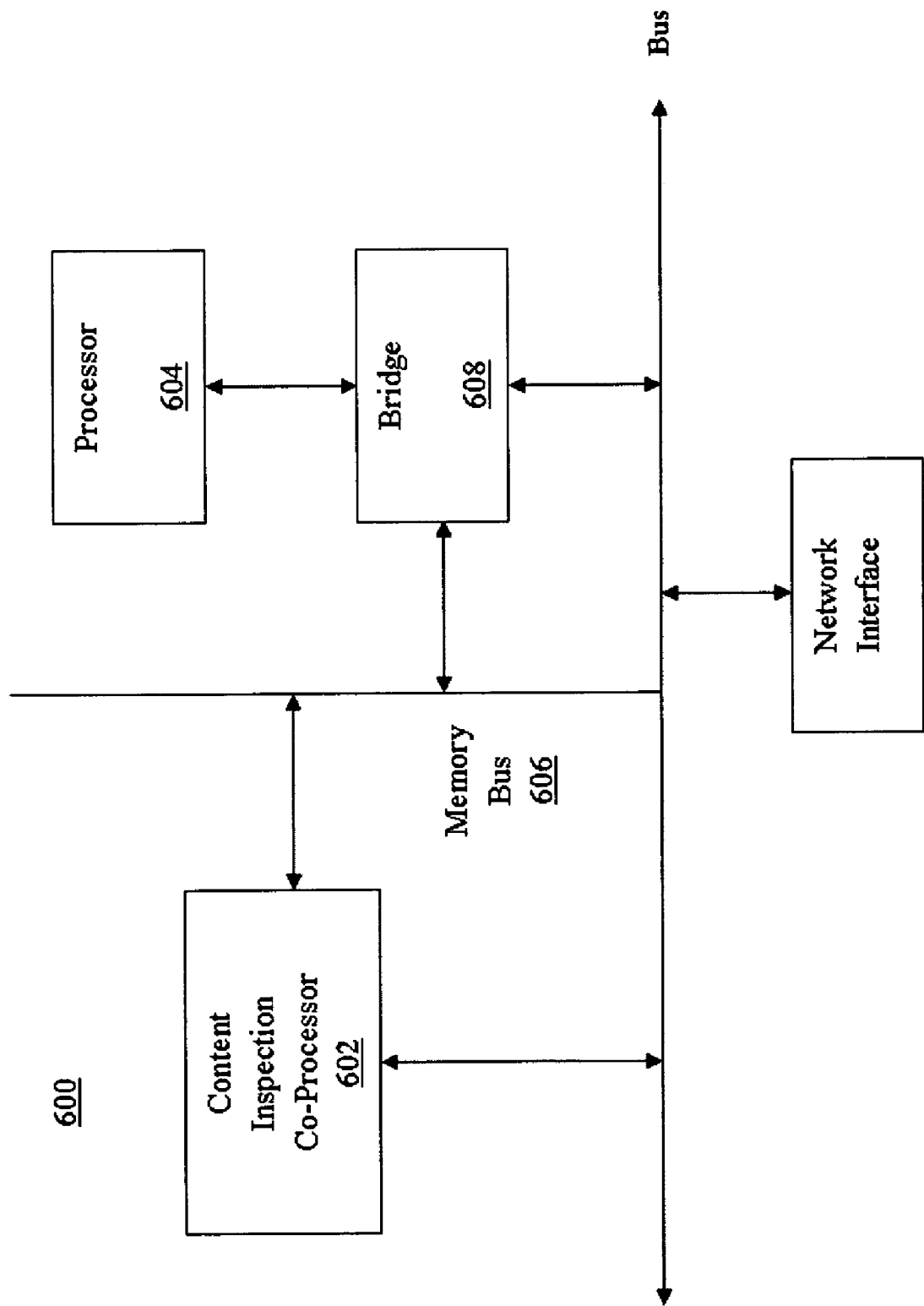
FIG. 6 is a block diagram that illustrates a system upon which an embodiment of the system security approaches may be implemented.
Figure 7:
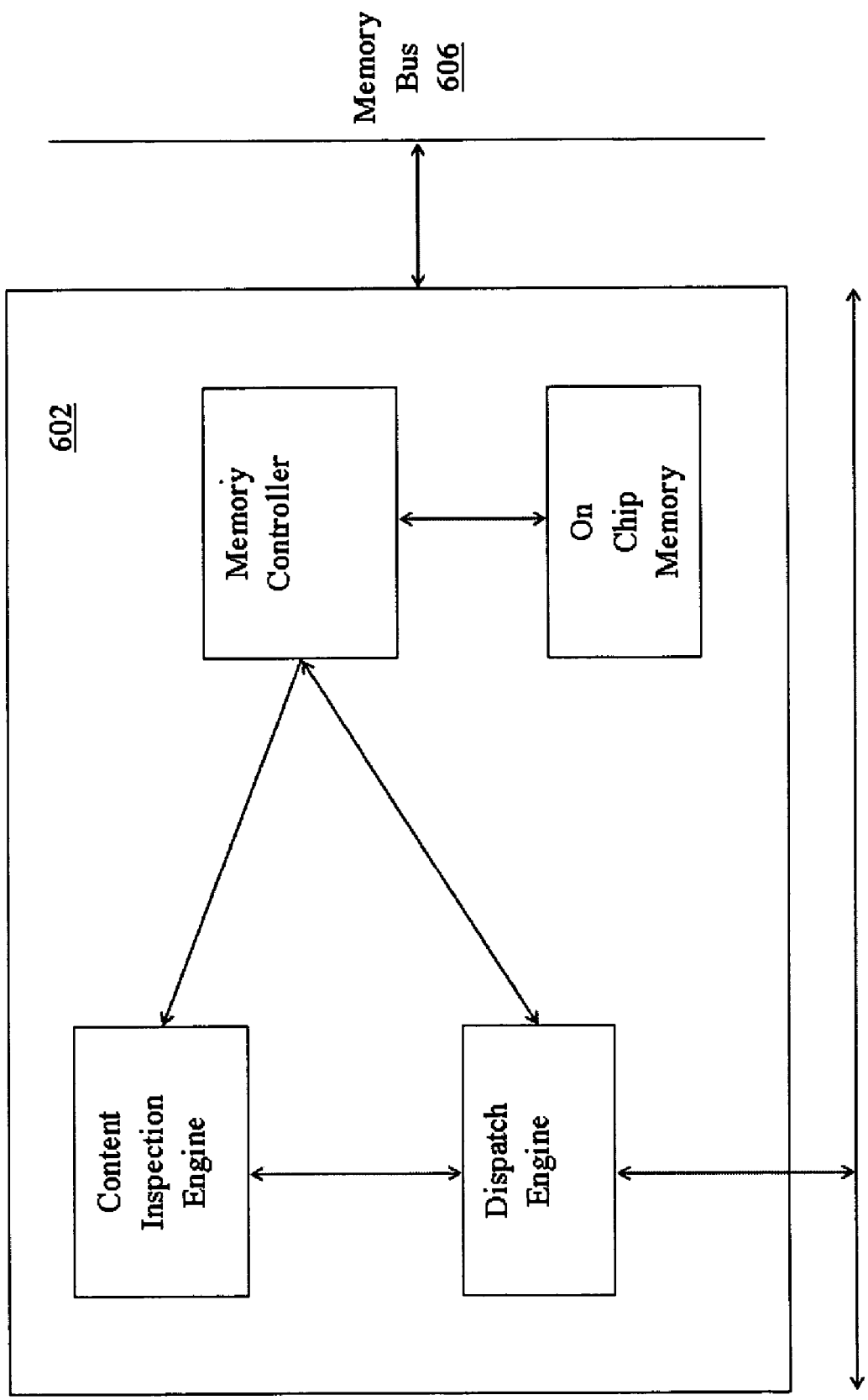
FIG. 7 is a block diagram of one embodiment of a content inspection co-processor.

FIG. 6 is a block diagram that illustrates a system 600 upon which an embodiment of the system security approaches may be implemented. Specifically, system 600 includes a processor 604, content inspection co-processor ("CICP") 602, which dedicates to perform the content inspection tasks. Processor 604 corresponds to processing unit 112 as shown in FIG. 1, and CICP 602 corresponds to dispatch engine 104, memory controller 108, and content inspection engine 106 as shown in FIG. 1. FIG. 7 is a block diagram of an embodiment of CICP 602.

Figure 8:
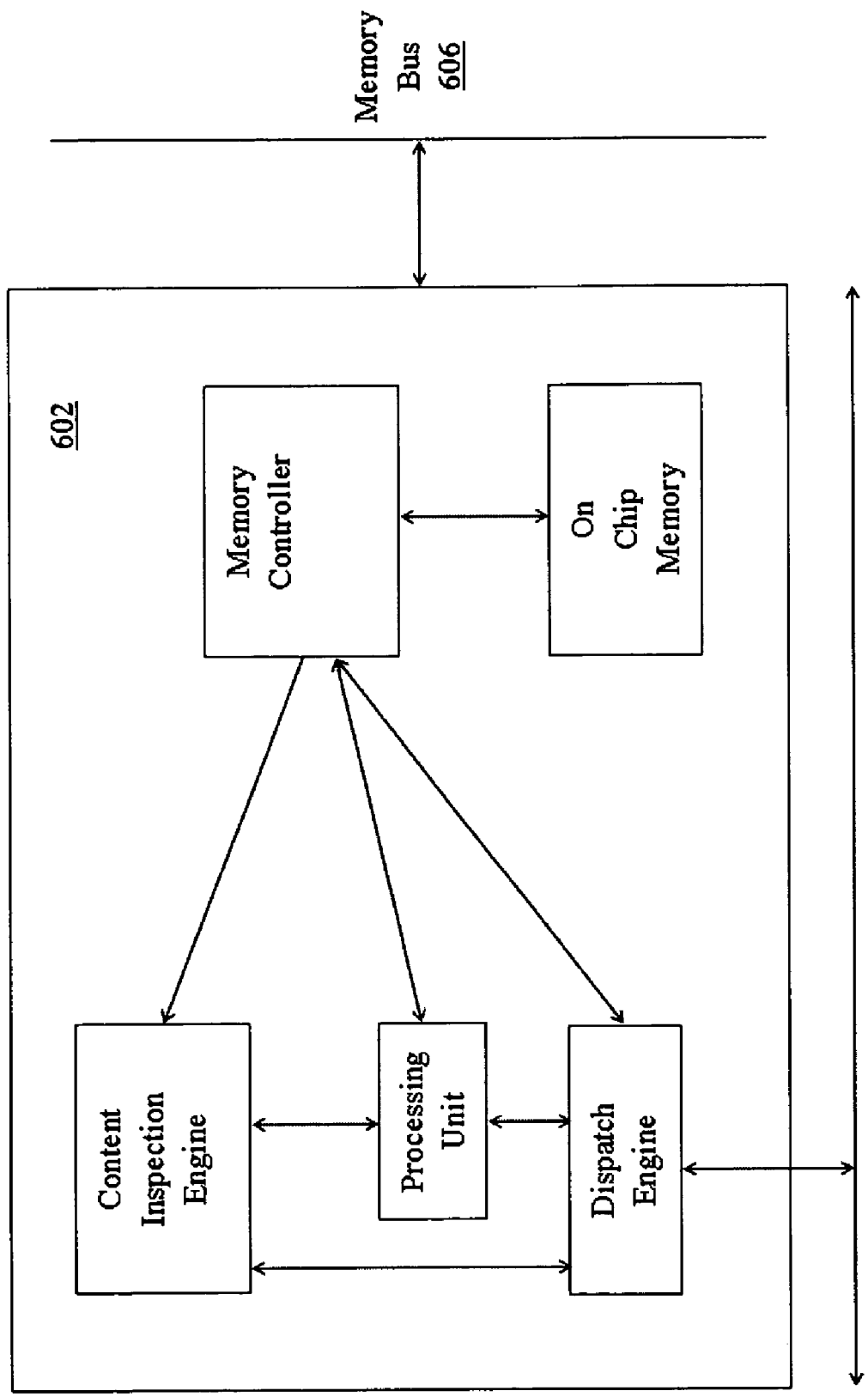
FIG. 8 is a block diagram of another embodiment of a content inspection co-processor.

FIG. 8 is a block diagram of another embodiment of CICP 602. Processing unit 112 is a part of CICP 602 in this implementation. In other words, this embodiment of CICP 602 includes two processing units, namely the processing unit and the content inspection engine.

CICP can be implemented as an application-specific integrated circuit ("ASIC"), programmed in a programmable logic device, or even as a functional unit in a system-on-chip ("SOC"). In one implementation, CICP 602 communicates with processor 604 via bridge 608 and memory bus 606. Alternatively, CICP 602 can communicate directly with processor 604 (this direction communication channel is not shown in FIG. 6), if processor 604 provides appropriate interfaces for such communication.

Processor 604 can either be a general purpose processor or a specific purpose processor. Some examples of a specific purpose processor are processors that are designed for, without limitation, signal processing, mobile computing, and multimedia related applications. Specific purpose processors often include interfaces that other external units can directly connect. For instance, such a specific purpose processor may include one or more memory interfaces that either various types of memories can connect to or a co-processing unit, such as CICP 602 can connect to.

Various types of memory modules can be placed inside of CICP 602 or coupled to memory bus 606 or CICP 602 to provide temporary storage for CICP 602. Some of these memory modules also provide temporary storage for processor 604. Some examples of the memory modules include various types of RAM and flash memory. Additionally, one or more of the components illustrated in FIG. 6 can be added (e.g., display device), combined (e.g., CICP 602 and processor 604 can reside on one SOC), or further divided (e.g., bridge 608 can be further divided into a processor bridge, a bus controller, and a memory controller) and still remain within the claimed scope of the system security approaches.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for monitoring a plurality of data units received by a computing device having a first processing unit and a second processing unit, comprising:

performing a set of tasks by said first processing unit prior to identifying a set of suspected data units out of said plurality of said data units by said second processing unit, wherein said set of said tasks includes:
  identifying a plurality of patterns from the content of said plurality of said data units;
  converting said plurality of patterns into a regular expression splitting said regular expression into a first sub-expression and a second sub-expression;
  formulating a first finite automaton from said first sub-expression with a first initial state and a first final state;
  formulating a second finite automaton from said second sub-expression with a second initial state and a second final state;
  constructing a dependency relationship between said first finite automaton and said second finite automaton;
  inserting a state in between said first finite automaton and said second finite automaton in response to identifying an overlapped portion between said first finite automaton and said second finite automaton;
  formulating a third finite automaton by merging said first finite automaton, said second finite automaton, and optionally said state while maintaining status of one or more of said first final state and said second final state; and
identifying said set of said suspected data units by said second processing unit by moving said plurality of said data units through said third finite automaton, wherein the content of said set of said suspected data units collectively matches any of said plurality of patterns.

2. The method as recited in claim 1, further comprising:
distributing said plurality of said data units to said first processing unit and said second processing unit according to the types of said data units and the data contained in said data units.

3. The method as recited in claim 2, further comprising:
decompressing the compressed data contained in said plurality of said data units according to the instructions contained in said data units prior to identifying said set of said suspected data units.

4. The method as recited in claim 2, further comprising:
responding to an anomaly associated with said plurality of said data units according to an anomaly policy, wherein said anomaly policy tracks characteristics of said plurality of
said data units other than said plurality of said patterns.

5. The method as recited in claim 4, wherein said anomaly policy is configurable.

6. The method as recited in claim 4, further comprising rectifying said set of said suspected data units or said anomaly.

7. A system for monitoring a plurality of data units, comprising:
  a first processing means for performing a set of tasks prior to identifying a set of suspected data units out of said plurality of said data units by a second processing means, wherein said set of said tasks includes:
    identifying a plurality of patterns from the content of said plurality of said data units;
    splitting a regular expression that corresponds to said patterns into a first sub-expression and a second sub-expression;
    formulating a first finite automaton from said first sub-expression with a first initial state and a first final state;
    formulating a second finite automaton from said second sub-expression with a second initial state and a second final state;
    constructing a dependency relationship between said first finite automaton and said second finite automaton;
    inserting a state in between said first finite automaton and said second finite automaton in response to identifying an overlapped portion between said first finite automaton and said second finite automaton;
    formulating a third finite automaton by merging said first finite automaton, said second finite automaton, and optionally said state while maintaining status of one or more of said first final state and said second final state; and
  said second processing means for identifying said set of said suspected data units by moving said plurality of said data units through said third finite automaton, wherein the content of said set of said suspected data units collectively matches any of said plurality of patterns.

8. The system as recited in claim 7, further comprising:
means for distributing said plurality of said data units to said first processing means and said second processing means according to the types of said data units and the data contained in said data units.

9. The system as recited in claim 8, wherein said first processing means further:
decompresses the compressed data contained in said plurality of said data units according to the instructions contained in said data units prior to identifying said set of said suspected data units.

10. The system as recited in claim 8, wherein said first processing means further:
responds to an anomaly associated with said plurality of said data units according to an anomaly policy, wherein said anomaly policy tracks characteristics of said plurality of said data units other than said plurality of said patterns.

11. The system as recited in claim 10, wherein said anomaly policy is configurable.

12. The system as recited in claim 10, wherein said first processing unit further rectifies said set of said suspected data units or said anomaly.

13. A system for monitoring a plurality of data units, comprising:
  a distribution engine;
  a processing unit, coupled to said distribution engine;
  a content inspection engine, coupled to said distribution engine and said processing unit;
  a memory controller, coupled to said distribution engine, said processing unit, and said content inspection engine, wherein:
  said processing unit performs a set of tasks prior to identifying a set of suspected data units out of said plurality of said data units by said content inspection engine, wherein said set of said tasks includes:
    identifying a plurality of patterns from the content of said plurality of said data units;
    splitting a regular expression that corresponds to said patterns into a first sub-expression and a second sub-expression;
    formulating a first finite automaton from said first sub-expression with a first initial state and a first final state;
    formulating a second finite automaton from said second sub-expression with a second initial state and a second final state;

constructing a dependency relationship between said first finite automaton and said second finite automaton;

inserting a state in between said first finite automaton and said second finite automaton in response to identifying an overlapped portion between said first finite automaton and said second finite automaton;

formulating a third finite automaton by merging said first finite automaton, said second finite automaton, and optionally said state while maintaining status of one or more of said first final state and said second final state; and said content inspection engine identifies said set of said suspected data units by moving said plurality of said data units through said third finite automaton, wherein the content of said set of said suspected data units collectively matches any of said plurality of patterns.

14. The system as recited in claim 13, wherein said distribution engine distributes said plurality of said data units to said processing unit, said content inspection engine, and said memory controller according to the types of said data units and the data contained in said data units.

15. The system as recited in claim 14, wherein said processing unit further decompresses the compressed data contained in said plurality of said data units according to the instructions contained in said data units prior to identifying said set of said suspected data units.

16. The system as recited in claim 14, wherein said processing unit further responds to an anomaly associated with said plurality of said data units according to an anomaly policy, wherein:

said anomaly policy tracks characteristics of said plurality of said data units other than said plurality of said patterns.

17. The system as recited in claim 16, wherein said anomaly policy is configurable.

18. The system as recited in claim 16, wherein said processing unit further rectifies said set of said suspected data units or said anomaly.

19. A system for monitoring a plurality of data units, comprising:

a general purpose processor;

a content inspection co-processor directly or indirectly coupled to said general purpose processor, wherein said content inspection co-processor further includes:

a distribution engine;

a content inspection engine, coupled to said distribution engine;

a memory controller, coupled to said distribution engine and said content inspection engine, wherein:

said general purpose processor performs a set of tasks prior to identifying a set of suspected data units out of said plurality of said data units by said content inspection engine, wherein said set of said tasks includes:

identifying a plurality of patterns from the content of said plurality of said data units;

splitting a regular expression that corresponds to said patterns into a first sub-expression and a second sub-expression;

formulating a first finite automaton from said first sub-expression with a first initial state and a first final state;

formulating a second finite automaton from said second sub-expression with a second initial state and a second final state;

constructing a dependency relationship between said first finite automaton and said second finite automaton;

inserting a state in between said first finite automaton and said second finite automaton in response to identifying an overlapped portion between said first finite automaton and said second finite automaton;

formulating a third finite automaton by merging said first finite automaton, said second finite automaton, and optionally said state while maintaining status of one or more of said first final state and said second final state; and said content inspection engine identifies said set of said suspected data units by moving said plurality of said data units through said third finite automaton, wherein the content of said set of said suspected data units collectively matches any of said plurality of patterns.

20. The system as recited in claim 19, wherein said distribution engine distributes said plurality of said data units to said general purpose processor, said content inspection engine, and said memory controller according to the types of said data units and the data contained in said data units.

21. The system as recited in claim 20, wherein said general purpose processor further decompresses the compressed data contained in said plurality of said data units according to the instructions contained in said data units prior to identifying said set of said suspected data units.

22. The system as recited in claim 20, wherein said general purpose processor further responds to an anomaly associated with said plurality of said data units according to an anomaly policy, wherein:

said anomaly policy tracks characteristics of said plurality of said data units other than said plurality of said patterns.

23. The system as recited in claim 22, wherein said anomaly policy is configurable.

24. The system as recited in claim 22, wherein said general purpose processor further rectifies said set of said suspected data units or said anomaly.

* * * * *